United States Patent [11] 3,623,159

| [72] | Inventors | Robert F. Bell;<br>Andrew L. Davis; James M. Tresidder, Jr., all of Sunnyvale, Calif. |
|---|---|---|
| [21] | Appl. No. | 782,928 |
| [22] | Filed | Dec. 11, 1968 |
| [45] | Patented | Nov. 23, 1971 |
| [73] | Assignee | Sylvania Electric Products Inc. |

[54] CAPACITIVE INTRUSION DETECTION SYSTEM
30 Claims, 9 Drawing Figs.

| [52] | U.S. Cl. | 340/258 C, 324/60 CD |
|---|---|---|
| [51] | Int. Cl. | G08b 13/26 |
| [50] | Field of Search | 340/258, 200; 324/60 CD, 61 |

[56] References Cited
UNITED STATES PATENTS

| 3,452,272 | 6/1969 | Collins et al. | 324/60 |
|---|---|---|---|
| 2,703,876 | 3/1955 | Edmundson et al. | 340/200 X |
| 2,826,753 | 3/1958 | Chapin | 340/258 |

*Primary Examiner*—John W. Caldwell
*Assistant Examiner*—Michael Slobasky
*Attorneys*—Norman J. O'Malley, John F. Lawler and Russell A. Cannon ABSTRACT: Each time the capacitance of a protected aircraft is charged to a prescribed threshold voltage level by a constant current source, it is discharged and an event or count is recorded in a first counter which automatically resets when it is full to repeat this operation cycle. The presence of an intruder near the aircraft causes its capacitance, and thus the time to fill the first counter, to change. An up/down counter is responsive to the outputs of the first counter and a clock generator for first counting up the number of clock pulses that are produced. When the first counter is half-full, the second counter counts down (subtracts) from the contents thereof the number of clock pulses that are produced prior to reset of the first counter when it is full. A decoder network monitors the remainder count in the up/down counter and initiates an alarm indicating intrusion of the protected aircraft area when the absolute value of the remainder count exceeds a prescribed minimum count at the end of any operation cycle. The system is reset at the end of each cycle.

INVENTORS
ROBERT F. BELL
ANDREW L. DAVIS
JAMES M. TRESIDDER, JR.

BY *Russell A. Cannor*

AGENT

INVENTORS
ROBERT F. BELL
ANDREW L. DAVIS
JAMES M. TRESIDDER, JR.

BY *Russell A. Cannon*
AGENT

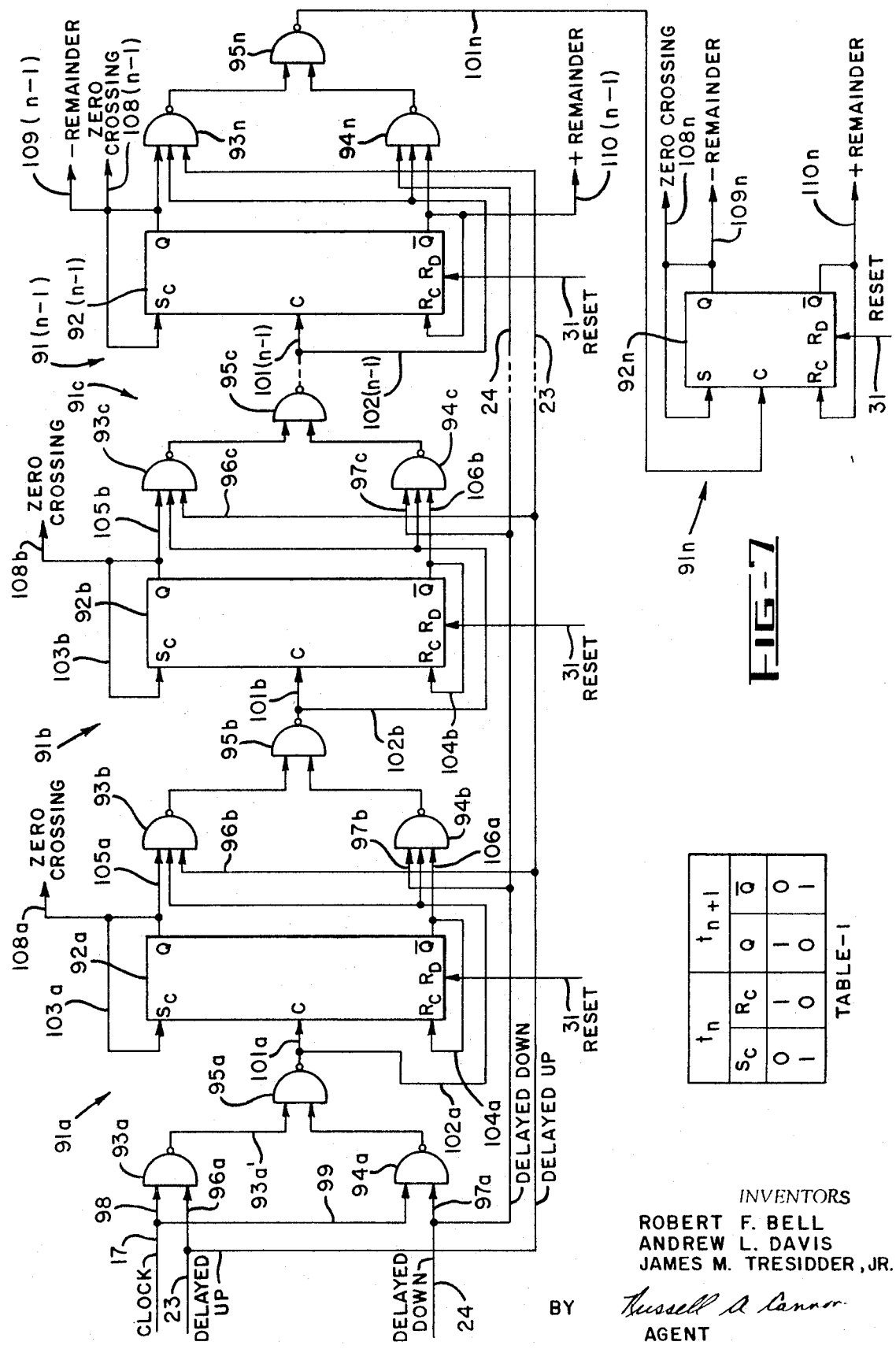

CAPACITIVE INTRUSION DETECTION SYSTEM

BACKGROUND OF INVENTION

This invention relates to intrusion detection systems and more particularly to such systems that operate in response to changes in a capacitance associated with the protected area that are produced by the presence of a person or object in the protected area for indicating intrusion thereof.

Aircraft presently used by commercial airlines are very expensive. Also, the lives of many people depend on their being in proper operating condition. It is necessary therefore that the security of these vehicles be maintained and that authorities be immediately notified when an unauthorized person enters an area near or actually touches an aircraft. Also, since new cars and trucks are expensive it is desirable to monitor the security of one or many such vehicles located on automotive and fleet truck storage lots to prevent tampering with them.

Capacitive-type intrusion detection systems have been employed to prevent intrusion of areas and vehicles. Prior art systems utilize the vehicle to be protected or employ an array of wires extending around the perimeter of the protected area or vehicle. The net capacitances between the wires and the ground and between the vehicle and ground are caused to change by the presence of an object such as an intruder in the vicinity of the wires of vehicle. In one prior art system, a capacitance change is monitored by connecting the capacitance as an element of a capacitive bridge. In other prior art systems a capacitance change is monitored by coupling the capacitance to the tuned circuit of an oscillator to change the operating frequency thereof. Since the capacitance change caused by an intruder may be small compared to the net capacitance of the system, the sensitivity of such systems is low. Also, it is difficult to maintain such monitoring circuits sufficiently stable to accurately measure the small change in capacitance caused by an intruder.

An object of this invention is the provision of an improved capacitive-type intrusion detection system.

Another object is the provision of such a system wherein the effective capacitance change caused by an intruder is increased.

Another object is the provision of a system using digital processing techniques whereby a very broad range of applications may be achieved without readjusting or changing any system parameters.

SUMMARY OF THE INVENTION

In accordance with this invention, the presence of an intruder in a protected area is determined by monitoring the change in the net system capacitance associated with the protected area. The capacitance change caused by an intruder is monitored by comparing indications of the durations of two different time intervals which are each determined by charging the capacitance to a prescribed threshold voltage level and discharging the capacitance a prescribed number of times. If the difference between the two indications is outside of prescribed limits, an alarm is given indicating intrusion of the protected area. In one embodiment of this invention, the system capacitance includes the capacitance of a protected aircraft. The comparison is performed in an up/down counter which counts "up" the number of clock pulses generated during a first time interval and then counts "down" the number of clock pulses generated during a second time interval, the duration of each time interval being that required to produce the same number of charge-discharge cycles of the system capacitance. An alarm is initiated if the remainder count is outside of prescribed limits.

DESCRIPTION OF DRAWINGS

FIG. 7 is a schematic block diagram of the up/down counter of FIG. 1;

DESCRIPTION OF PREFERRED EMBODIMENT

Figure 1:
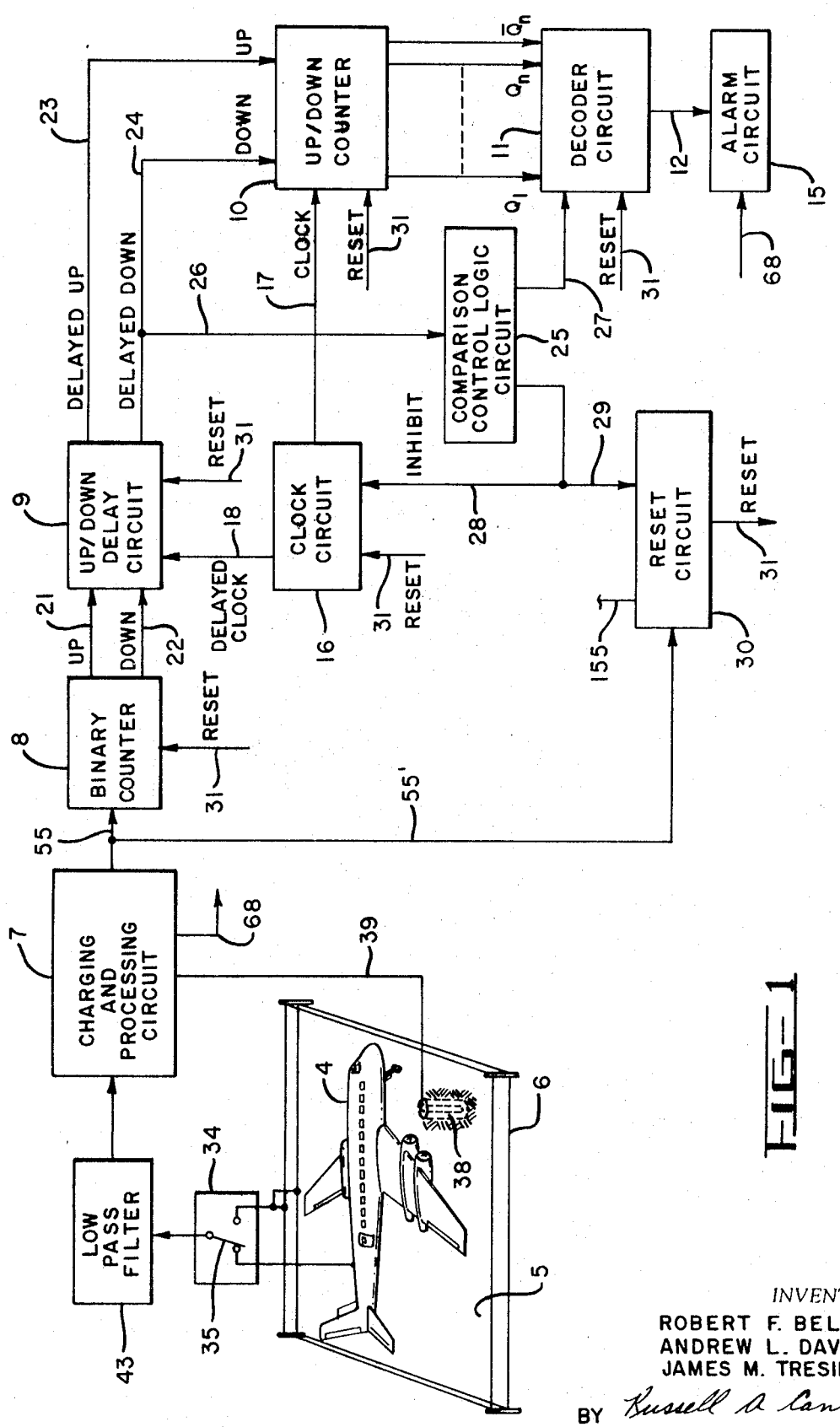
FIG. 1 is a schematic block diagram of a system embodying this invention.

Referring now to FIG. 1, an aircraft 4 is located in an area 5 that is enclosed by a fence 6. A system embodying this invention and useful for protecting the aircraft 4 comprises charging and processing circuit 7, binary counter 8, up/down delay circuit 9, up/down counter 10 and decoder circuit 11 which are electrically connected in series between the aircraft and alarm circuit 15. Clock circuit 16 produces a train of clock pulses which are applied on line 17 to counter 10. Circuit 9 is responsive to delayed clock pulses on line 18 for selectively delaying up and down count control signals on lines 21 and 22 from counter 8. Counter 10 is responsive to the delayed up count control signal on line 23 for counting up the number of clock pulses that are produced during one time interval. Counter 10 is responsive to the delayed down count control signal on line 24 for counting down or subtracting from the contents thereof the number of clock pulses that are produced during another time interval. Comparison control logic circuit 25 is responsive to the negative-going transition of the delayed down count control signal on line 26 for producing a control pulse on line 27 which causes circuit 11 to decode the contents of the up/down counter. The output of circuit 11 on line 12 controls the operation of the alarm circuit. Reset circuit 30 is responsive to the output of the comparison circuit on line 29 for resetting the system.

Figure 2:
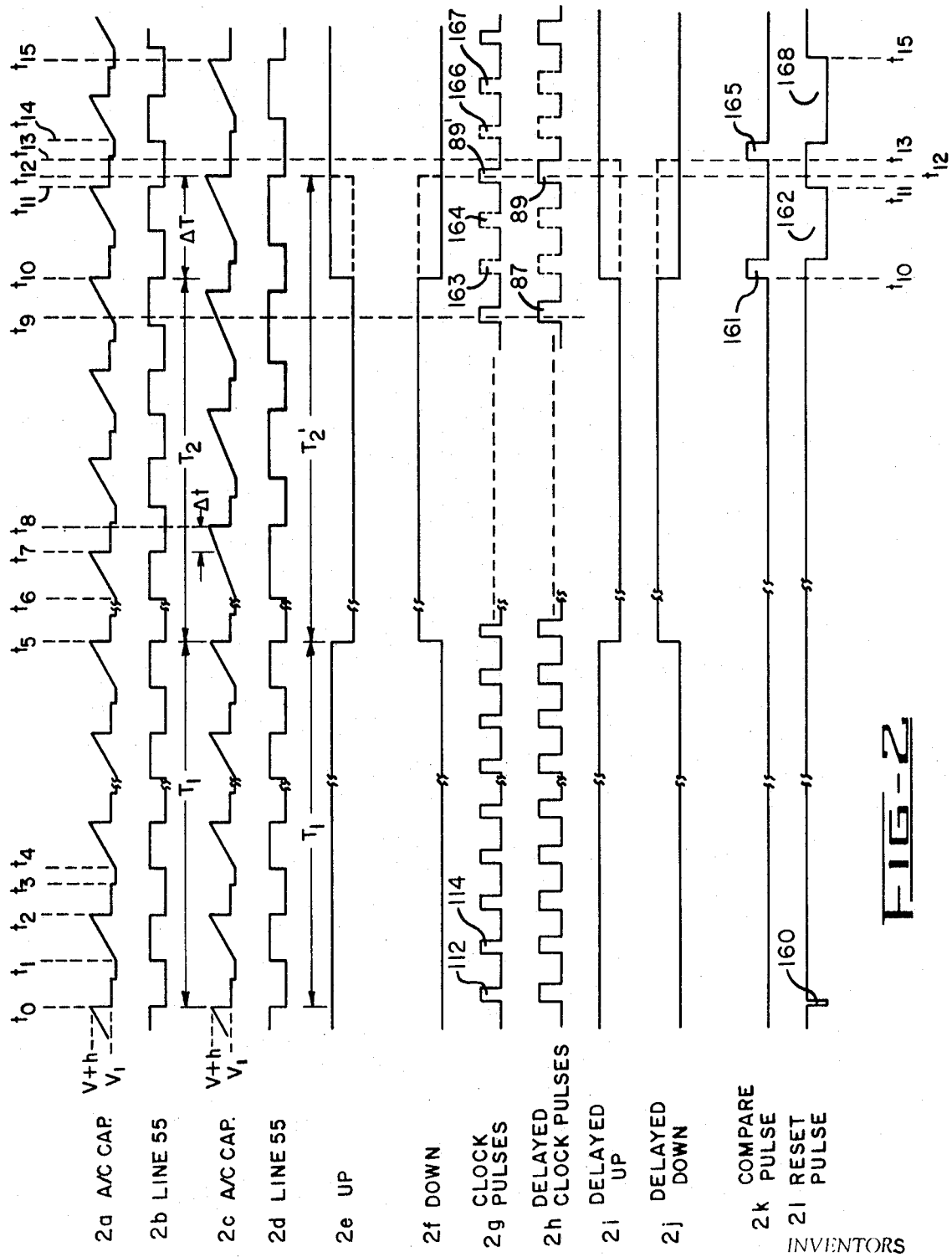
FIG. 2 is a group of waveforms illustrating the operation of the system of FIG. 1.

The operation of the system is illustrated by the waveforms of FIG. 2 and will be described in detail hereinafter. Referring now to FIG. 2, the waveforms of FIGS. 2a and 2b represent the charge on the aircraft capacitance and the output of circuit 7, respectively, when there is no intrusion of the protected area; the waveforms of FIGS. 2c and 2d represent the charge on the aircraft capacitance and the output of circuit 7, respectively, when there is an intrusion of the protected area; the waveforms of FIGS. 2e and 2f represent the up and down count control signals on lines 21 and 22, respectively; the waveforms of FIGS. 2g and 2h represent clock pulses and delayed clock pulses on lines 17 and 18, respectively; the waveforms of FIGS. 2i and 2j represent delayed up and down count control signals on lines 23 and 24, respectively; the waveform of FIG. 2k represents the control pulse on line 27 from the comparison circuit; and, the waveform of FIG. 2l represent the reset pulse on line 31. The solid waveforms in FIGS. 2e, 2f/2i and 2j are associated with the waveforms of FIGS. 2a and 2b and illustrate the operation of the binary counter 8 and delay circuit 9 when there is no intrusion of the protected area. The dashed waveforms in these figures are associated with the waveforms of FIGS. 2c and 2d and illustrate the operation of counter 8 and circuit 9 when there is an intrusion of the protected area.

Briefly, the aircraft capacitance is charged at a rate that is a function of this capacitance. Each time the charge on this capacitance exceeds a prescribed threshold voltage level $V_{th}$ (see FIG. 2a, time $t_2$), the capacitance is discharged, the logic level of the output of circuit 7 is reversed (see FIG. 2b, time $t_2$) and the contents of counter 8 is advanced. The logic levels of the up count control signals on lines 21 and 23 are initially high (see FIGS. 2e and 2i, respectively) and cause the counter 10 to count "up" the number of clock pulses (see FIG. 2g) that are produced. When the contents of counter 8 corresponds to a prescribed count, the logic levels of the down count control signals on lines 22 and 24 go high (see FIGS. 2f and 2j, respectively, time $t_5$) and cause counter 10 to count "-down" from the contents thereof the number of clock pulses that are produced. When the contents of counter 8 corresponds to twice the prescribed count the logic level of the down count control signal on line 26 goes low (see FIG. 2f, time $t_{10}$). The comparison circuit is responsive to this negative transition for producing a control pulse (see FIG. 2k) that biases circuit 11 to decode the remainder count in the up/down counter. If this count is outside of prescribed limits an alarm is initiated. Circuit 30 is responsive to the comparison pulse for resetting the system.

In the following description, circuits are considered to be responsive to negative-going transitions of an input signal.

As illustrated in FIG. 1, the charging and processing circuitry may be electrically connected through switch 34 to either the aircraft 4 or fence 6 or both. Circuit 7 could also be connected to a number of aircraft. In order to simplify the following description, however, the processing circuit will be considered to only be connected to the aircraft 4 by movable contact 35 of the switch. Circuit 7 is connected through line 39 to the tiedown post 38 adjacent the aircraft in order to ground the system.

Figure 3:
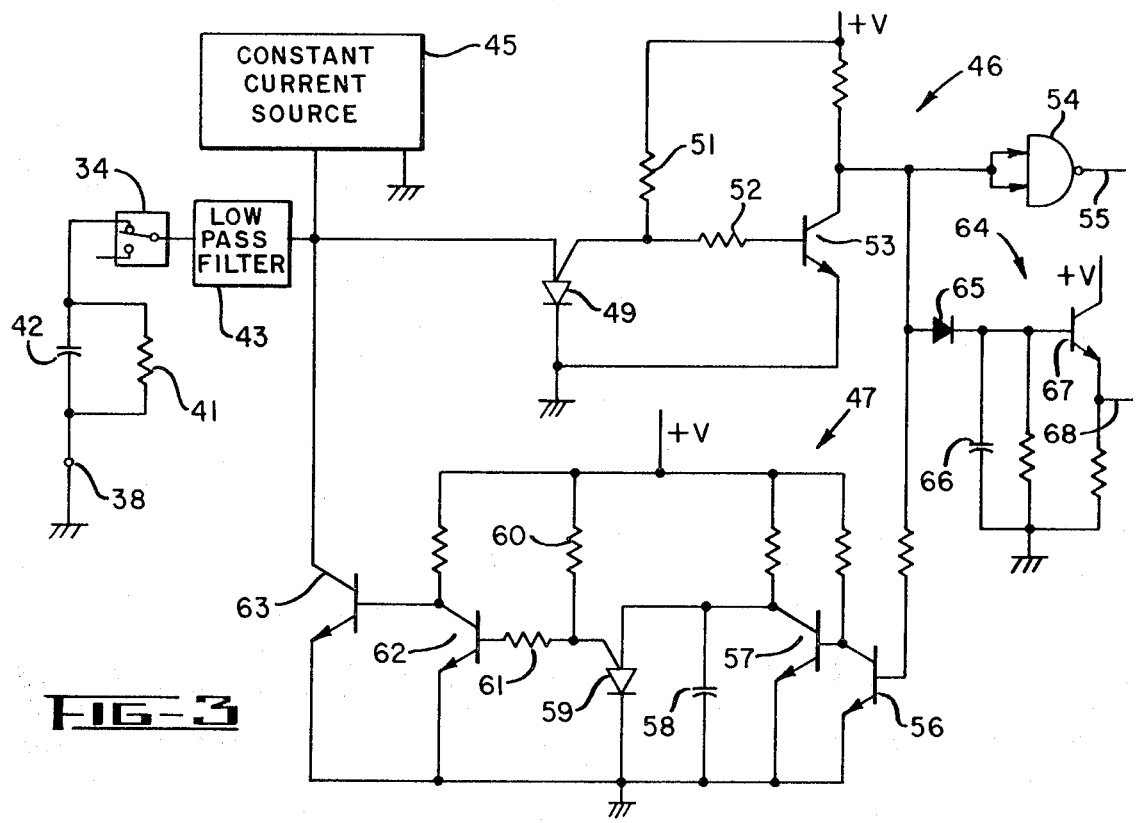
FIG. 3 is a schematic block and circuit diagram of the charging and processing circuit of FIG. 1.

Referring now to FIG. 3, the electrical equivalent circuit of the aircraft is approximated by the parallel combination of a resistor 41 and a capacitor 42 between the body of the aircraft and ground. The aircraft capacitance is electrically connected through switch 34 and low-pass filter 43 to circuit 7. Filter 43 is employed to prevent radio frequency interference present on the surface of the aircraft from entering the charging and processing circuit 7. The lower frequencies present in the charging signal are passed without attenuation.

Circuit 7 comprises a constant current source 45, a threshold circuit 46 and a time delay circuit 47. Current source 45 and threshold circuit 46 are both connected across capacitor 42. Circuit 47 is connected between the output of the threshold circuit and the current source for extending the time interval between discharge of and the subsequent initiation of charging of the aircraft capacitance.

Threshold circuit 46 comprises a threshold device 49 connected in parallel with the aircraft capacitance. The threshold circuit 49 may, by way of example, be of programmable unijunction transistor. Transistor 49 is caused to conduct to discharge capacitor 42 when the magnitude of the charge thereon exceeds a predetermined threshold voltage level set by resistors 51 and 52. The binary output voltage on the collector of transistor switch 53 is inverted by gate 54 and applied on lines 55 and 55' to counter 8 and reset circuit 30, respectively.

Time delay circuit 47 comprises transistor switches 56 and 57 which control the charging of capacitor 58. Transistor 59 is a threshold device connected in parallel with capacitor 58 to discharge this capacitor when the magnitude of the charge thereon exceeds a predetermined threshold voltage level set by resistors 60 and 61. Conduction of transistor 59 controls the operation of transistor switches 62 and 63 and thus the time of initiation of charging of the aircraft capacitance.

Referring now to FIG. 2a, when capacitor 42 is discharged for example at time $t_1$, transistors 49 and 59 are cut off; transistors 53, 57 and 62 are saturated; and transistors 56 and 63 are cut off. Thus, the output of inverter 54 and circuit 7 on line 55 is high at time $t_1$, see FIG. 2b. The charge on capacitor 42 increases at time $t_1$ at a rate that is a function of the aircraft capacitance. When the charge on capacitor 42 exceeds the threshold level $V_{th}$ at time $t_2$, transistor 49 conducts to discharge capacitor 42. Transistor 49 can only discharge capacitor 42 to the level $V_1$, which is the saturated "on" voltage of transistor 49.

Conduction of transistor 49 causes transistor 53 to be cut off so that the output of the inverter is low, see FIG. 2b, time $t_2$. This operation drives transistor 56 into saturation in order to cut off transistor 57 to allow a charge to build up on capacitor 58. When the charge on capacitor 58 exceeds the threshold voltage level set by resistors 60 and 61, transistor 59 conducts to discharge this capacitor and bias transistor 62 into cut off. This causes transistor 63 to operate in saturation to dump the remaining charge on the aircraft capacitance at time $t_3$ and thus cut off transistor 49. The time interval between $t_3$ and $t_4$ is that time required for transistors 49 and 59 to turn off after being saturated. This operation of transistor 49 sets the active elements to their initial operating states and the operation cycle is repeated.

It is seen from the above that circuit 47 extends the time interval between successive threshold crossings of the charge on the aircraft capacitance by the constant time interval $t_2$ to $t_4$. The only variable element associated with charging capacitor 42 to the threshold level $V_{th}$ is the aircraft capacitance itself. Thus, the duration of the charge-discharge cycle between times $t_1$ and $t_4$, for example, is a function of the capacitance of capacitor 42. This charging and discharging of the aircraft capacitance is repetitive, the duration of the charge-discharge cycle changing whenever there is a change in the aircraft capacitance such as may be caused by an intruder.

Measurements indicate that depending on the type of aircraft and atmospheric conditions, the aircraft capacitance may vary from 2,200 pf. to 10,000 pf. The corresponding aircraft resistance may vary from 1 ohms to greater than 1M ohms. The charge on the aircraft capacitance is defined by the relationship $V_0(t) = IR(1 - e^{-TE \cdot t/RC})$  (1) where $C$ is the aircraft capacitance, $R$ is the resistance in parallel with this capacitance, $t$ is time, $I$ is the charging current and $V_0$ is the voltage across the capacitance. The change 2 capacitance has been determined empirically to range from 2 pf. when an intruder is near an aircraft to 100 pf. when an intruder actually touches the aircraft. Thus, since the charging period is defined as $$t = -RC \ln\left(1 - \frac{E}{IR}\right) \quad (2)$$

the charging period $t$ of the aircraft capacitance may range from 2.718 $\mu$ seconds ($R$ 1M ohms, $C$=2,200pf.) to 9.22 $\mu$ seconds ($R$=1K ohms, $C$=10,000 pf.). The incremental change in this charging period varies from 1.02 nanoseconds ($R$=1M ohms, $C$=2,200 pf.) to 69.31 nanoseconds ($R$=1 ohms, $C$=10,000 pf.).

The waveform of FIG. 2a illustrates the case where there is no intrusion of the protected area so that the aircraft capacitance remains constant. Thus, the time intervals between adjacent threshold crossings are equal. The waveform of FIG. 2c illustrates the case where an intruder in the protected area causes a change in the aircraft capacitance between times $t_5$ and $t_6$. In the latter case, there is an incremental time change $\Delta t$ in the duration of the charge-dishcarge cycle which is a function of the incremental change $\Delta C$ in the aircraft capacitance. This incremental time change between successive threshold crossings is effectively increased during each subsequent charge-discharge cycle, the net time difference being a linear function of the number of cycles occuring. Thus, taking into account only the charge-discharge cycles actually illustrated in FIG. 2c, the net time difference $\Delta T = 4(\Delta t)$.

Referring now to FIG. 3, the collector voltage of transistor switch 53 is also coupled to peak detector circuit 64 which comprises diode 65, capacitor 66 and buffer amplifier 67. During normal operation when the aircraft capacitance is charged so that the voltage across it repeatedly exceeds the threshold level set by circuit 46, the voltage developed across the emitter resistor of amplifier 67 and on line 68 is high. If the charge on the aircraft capacitance is constant for any reason such as an equipment malfunction or an attempt to compromise the system, the voltage on capacitor 66 and the output voltage on line 68 will be low. Circuit 15 is responsive to the voltage on line 68 for producing an alarm if this voltage is low for more than a predetermined minimum time interval.

Counter 8 is a conventional $m$-stage counter which is responsive to the output of circuit 7 for counting the number of threshold crossings of the charge on capacitor 42. The outputs of counter 8 on lines 21 and 22 are the Q and $\bar{Q}$ outputs of the $m^{th}$ stage thereof. When the system is turned on and is reset, the Q and $\bar{Q}$ outputs of each stage are set to be high and low, see FIGS. 2e and 2f, respectively, time $t_0$. Each time the magnitude of the charge on capacitor 42 exceeds the threshold level $V_{th}$, the contents of counter 8 is advanced by one. After $2^{m'7E'1}$ threshold crossings of the charge on capacitor 42 have occurred at time $t_5$, counter 8 is half-full so that the outputs thereof are now low and high, respectively. After $2^{m'7E'}$ more threshold crossings of the charge on capacitor 42 occur, at time $t_{10}$ the counter is full and automatically rests itself so that the outputs thereof are again high and low, respectively. Since the time required to register $2^{m'7E'1}$ counts in counter 8 is a function of the magnitude of the aircraft capacitance, it is possible to determine whether the aircraft protected area is comprised by comparing the time interval required to advance the contents of the binary counter to the count of $2^{m'7E'1}$ with the time interval required to then advance the contents of the counter to the count of $2^m$. If the difference between these time intervals exceeds a prescribed minimum value, an alarm indicating intrusion of the protected aircraft is initiated. The clock circuit 16, up/down counter 10 and decoder circuit 11 are utilized in making this comparison.

As described more fully hereinafter, this is accomplished by causing up/down counter 10 to count "up" the number of clock pulses generated during the time for the contents of counter 8 to increase to $2^{m'7E'1}$. Counter 10 then counts "down" or subtracts from the contents thereof the number of clock pulses produced during the time for the contents of counter 8 to increase from $2^{m'7E'1}$ to $2^m$. When the contents of counter 8 is $2^m$, circuit 11 decodes the contents of the up/down counter and initiates an alarm if it is outside of prescribed limits.

Figure 4:
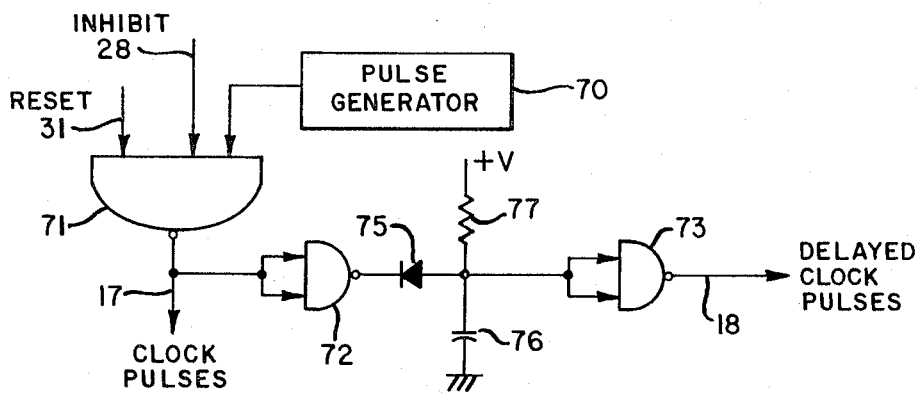
FIG. 4 is a schematic block and circuit diagram of the clock circuit of FIG. 1.

Referring now to FIG. 4, clock circuit 16 comprises pulse generator 70, multiple input NAND-gate 71, and inverting NAND-gates 72 and 73. Generator 70 may, by way of example, be a free-running multivibrator producing a train of output pulses. The inhibit and reset inputs to gate 71 are each high during normal counting operation to enable the gate to invert the output of multivibrator 70 to produce clock pulses on line 17, see FIG. 2g. The natural frequency of the multivibrator is such that it produces many pulses during each charge-discharge cycle of the aircraft capacitance. In order to simplify the waveforms and make them more clear, only two clock pulses are shown in FIG. 2g to occur during each charge-discharge cycle of capacitor 42. In an actual system embodying this invention, however, the natural frequency of multivibrator 70 was adjusted so that at least eight clock pulses, depending on the actual value of capacitor 42, were produced during each cycle. The output of inverter 72 is coupled through diode 75 to gate 73 and to capacitor 76 which is connected between a voltage source +V and a ground reference potential. The output of gate 73 is the delayed clock pulses, see FIG. 2h.

Figure 5:
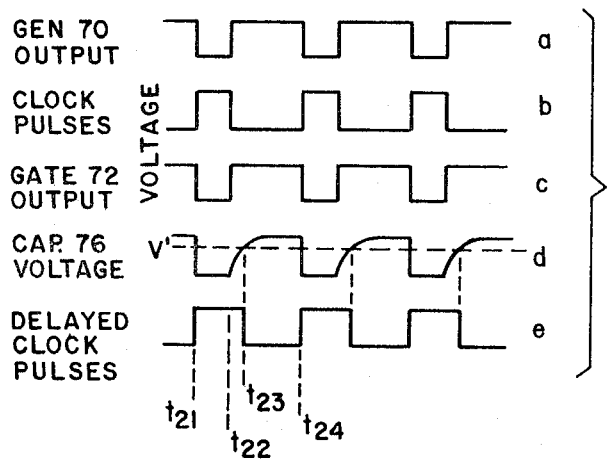
FIG. 5 is a group of waveforms illustrating the operation of the clock circuit of FIG. 4.

The waveforms of FIG. 5 are useful in explaining the operation of the clock circuit. Referring now to FIG. 5, the waveform of FIG. 5a represents the output of generator 70; the waveform of FIG. 5b represents a train of clock pulses on line 17; the waveform of FIG. 5c represents the output of gate 72; the waveform of FIG. 5d represents the voltage across capacitor 76; and, the waveform of FIG. 5e represents delayed clock pulses on line 18.

When the output of gate 72 is low at time $t_{21}$, see FIG. 5c, diode 75 conducts to discharge capacitor 76 and cause the output of gate 73 to be high (see FIG. 5e). When the clock pulse is terminated at time $t_{22}$, the output of gate 72 goes high causing diode 75 to be cut off and capacitor 76 to charge through resistor 77 to the supply potential +V. Since the high output of gate 72 is isolated from the input of gate 73 by the diode, the delayed clock pulse (see FIG. 2e) remains high at time $t_{22}$. When the charge on capacitor 76 exceeds the threshold level V' of gate 73 (see FIG. 5d), the latter conducts to terminate the delayed clock pulse at time $t_{23}$ (see FIG. 5e). The output of gate 73 remains low until the next clock pulse is received at time $t_{24}$. The time interval $t_{22}$ to $t_{23}$ between termination of the clock pulse and termination of the delayed clock pulse is equal to the time required for the effect of a clock pulse to be translated through up/down counter 10 as is described more fully hereinafter.

Figure 6:
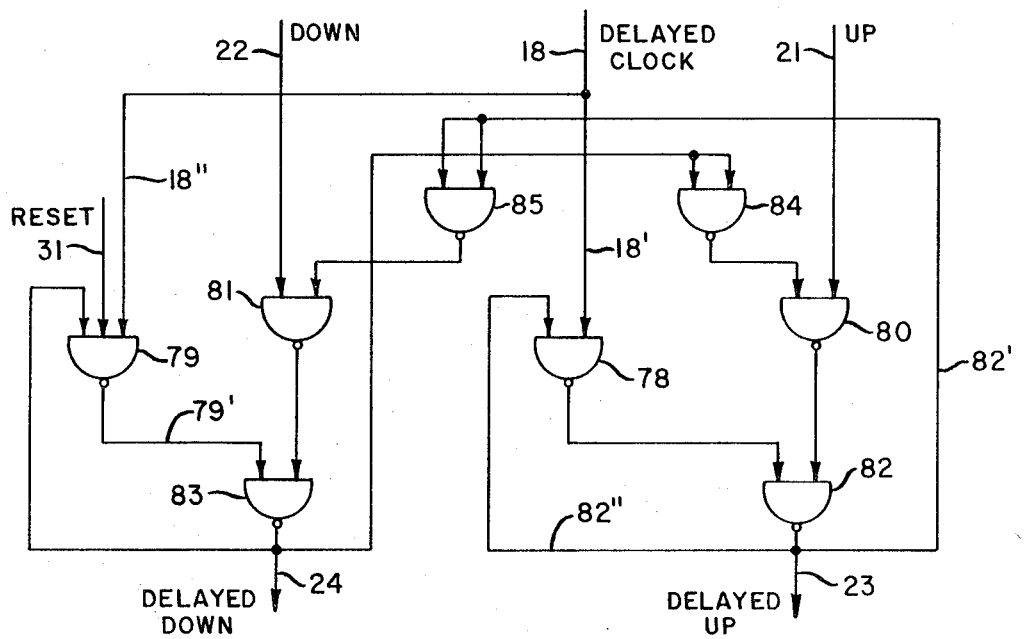
FIG. 6 is a schematic circuit diagram of the delay circuit of FIG. 1.

Delay circuit 9 is illustrated in FIG. 6 and comprises NAND-gates 78 and 79 which are responsive to delayed clock pulses on line 18, NAND-gates 80 and 81 which are responsive to the outputs of counter 8 on lines 21 and 22, respectively, NAND-gates 82 and 83, and inverting NAND-gates 84 and 85. The delay circuit is responsive to the delayed clock pulses for effectively extending the duration of the up and down count control signal outputs of counter 8 at their previous levels if the actual transitions between high and low logic levels of either of these signals actually occurs when a delayed clock pulse is high in order to provide delayed up and down count control signals. The delayed control signals are terminated on the negative transistor of the associated delayed clock pulse.

Consider that the outputs of the binary counter on lines 21 and 22 are low and high, see FIGS. 2e and 2f, respectively, time $t_7$. When a delayed clock pulse is not produced, the clock inputs to gates 78 and 79 are low causing the outputs thereof to be high. Since the signal on line 21 is low, the output of gate 80 is high. Both of the inputs to gate 82 are now high so that the output thereof on line 23 is low, see FIG. 2i, time $t_7$. The low output of gate 82 on line 82' causes the output of inverter 85 to go high to enable gate 81. Since the signal on line 22 is also high at this time, the output of gate 81 is low and causes the output of gate 83 to be high, see FIG. 2j, time $t_7$.

When a delayed clock pulse 87 is produced at time $t_9$, see FIG. 2h, the inputs on lines 18' and 18'' are now high. The second input to gate 78 is still low, however, so that the output of the delay circuit on line 23 is unchanged. All of the inputs to gate 79 are now high, so that the output thereof is low. Since the other input to gate 83 is already low, however, the operation of gate 83 and the output of the delay circuit on line 24 are also unchanged. Gates 78 and 79 return to their normal operating states on termination of the delayed clock pulse 87 (see FIG. 2h).

Consider now the operation of the delay circuit when the negative transition of the down count control signal output of counter 8 occurs at time $t_{12}$ during generation of a delayed clock pulse 89. The signal on line 22 is now low and causes the output of gate 81 to be high. As previously stated, however, the delayed clock pulse caused the second input to gate 83 on line 79' to be low until termination of the delayed clock pulse. Thus, the output of gate 83 on line 24 is maintained high until time $t_{13}$, see FIG. 2j, and the duration of the output of the binary counter on line 22, se FIG. 2f, is effectively extended until termination of the associated delayed clock pulse 89. The signal on line 21 is high at time $t_{12}$. Since the output of gate 83 is held high by the effect of the delayed clock pulse, however, the output of inverter 84 is still low so that the output of gate 80 remains high. The output of gate 82 on line 82'' was low prior to time $t_{12}$ and therefore maintains the output of gate 78 high. Thus, the output of gate 82 on line 23 remains low until termination of the delayed clock pulse 89 at time $t_{13}$ causes the output of inverter 84 to be high. The operation of circuit 9 is similar to that described above when the negative transition of the up count control pulse occurs during generation of a delayed clock pulse.

Up/down counter 10 is a logic circuit which is illustrated in FIG. 7 and comprises a plurality of stages 91. Each stage comprises a set-reset flip-flop 92 and NAND-gates 93, 94 and 95. Delayed up and down count control signals are applied on lines 96 and 97 to input terminals of gates 93 and 94, respectively, of each stage. Clock pulses are applied only on lines 98 and 99 to an input terminal of gates 93a and 94a, respectively, of the first stage 91a. The outputs of gates 93 and 94 of each stage are logically combined by the associated gate 95 to produce a timing pulse that is applied on line 101 to the clock input terminal C of the associated flip-flop and on line 102 to an input terminal of gates 93 and 94 of the next stage. The Q and $\bar{Q}$ outputs of each flip-flop 92 are applied on lines 103 and 104 to the clocked set and reset input terminals $S_C$ and $R_C$ thereof and on lines 105 and 106 to input terminals of gates 93 and 94, respectively, of the next stage. Outputs of counter 10 are coupled from Q and $\bar{Q}$ terminals of the flip-flops. The Q outputs of the first stage 91a and the $n^{th}$ stage 91n correspond to the least and most significant bits of the digital indication provided by counter 10.

Briefly, the up/down counter counts "up" the number of clock pulses produced during the time interval that the delayed up count control signal on line 23 is high and then counts "down" or subtracts from the contents thereof the number of clock pulses occuring during the time interval that the delayed down count control signal on line 24 is high. Since more than one clock pulse will normally be produced during each charge-discharge cycle of the aircraft capacitance and since the aircraft capacitance may be as high as 10,000 picofarads the count capacity of counter 10 must be large. In an actual system that was built and tested, eight clock pulses were produced in a charge-discharge cycle during which the aircraft capacitance was large. The up/down counter in this system included 18 stages and had a capacity of counting 262,144 clock pulses. The capacity of the counter is $2^n$, wherein $n$ is the number of stages in the counter. The capacity of the counter must be great enough to count, without overflowing, all the clock pulses which occur during the maximum length "up" count period as determined by the maximum aircraft capacitance plus the largest increase in capacitance due to the presence of an intruder, the minimum equivalent resistance in parallel with the aircraft capacitance, and the number of stages in counter 8. The equivalent aircraft capacitance and resistance determine the period of one charging cycle, and the number of stages in counter 8 determines the number of charging cycles in each "up" count period.

The operation of flip-flops 92 is summarized in table 1 which states that at the termination of the timing pulse on line 101, the flip-flops change operating states so that the Q and $\bar{Q}$ outputs thereof are the compliments of the set and reset inputs, respectively. When the system is initially turned on (e.g., at time $t_0$ in FIG. 2), a low pulse of short duration on line 31 causes the Q and $\bar{Q}$ outputs of each flip-flop to be initially low and high, respectively. Since the clock input is low at this time the outputs of the gates 93 and 94 are both initially high causing the output of each gate 95 to be low.

Consider now the operation of the up/down counter during the time interval that the delayed up signal on lines 23 and 96 is high, e.g., at time $t_0$, and enables gate 93a. Since the delayed down control pulse on lines 24 and 97 is low during this time interval, the output of each gate 94a is high and enables gate 95a. When the first clock pulse 112 is received in line 17, both inputs to gate 93a are high so that the output of gate 95a is high. Since the Q output of flip-flop 92a on line 105a is low at this time, however, the operation of gate 93b is unchanged by the high logic level signal on line 102a.

On the negative-going transition of clock pulse 112 the output of gate 95a goes low to terminate the timing pulse on line 101a to cause flip-flop 92a to change operating states to invert the Q and $\bar{Q}$ outputs thereof. The input to gate 93b on line 105a is therefore now high. Since the timing signal on line 102a is now low, however, the operation of gate 93b is unchanged so that the output of gate 95b is low. This causes the outputs of the other gates 95 to also be low and the contents of the associated flip-flops to be unchanged. Thus, the up/down counter 10 contains a count of 1.

When the next clock pulse 114 is received, both inputs to gate 93a are again high so that the output of gate 95a is also high. Since all of the inputs to gate 93b are now high, the timing signal from gate 95b is also high. The Q output of flip-flop 92b is low at this time, however, so the operation of the other gates 93 and 95 is unchanged.

On the negative transition of clock pulse 114, the output of gate 95a goes low to again cause flip-flop 92a to change operating states so that the Q output thereof on line 105a is now low. This causes the output of gate 93b to go high so that the timing signal on line 101b goes low. This termination of that timing signal causes flip-flop 92b to change operating states so that the Q output thereof on line 105b is high. Since the timing signal on line 102b is now low, however, the operation of gate 93c is unchanged. This causes the operation of the remaining gates and flip-flops to also be unchanged. Thus, after receiving the second clock pulse 114 and Q outputs of flip-flops 92b and 92a are high and low, respectively, and represent the binary number 10 which corresponds to the digit 2. The operation of counter 10 in counting "down" or subtracting clock pulses from the contents thereof when the delayed down count control signal on line 24 is high is similar to the operation described above. The subtracting function is accomplished by using the $\bar{Q}$ or complimentary outputs of the flip-flops to drive each succeeding stage.

Figure 8:
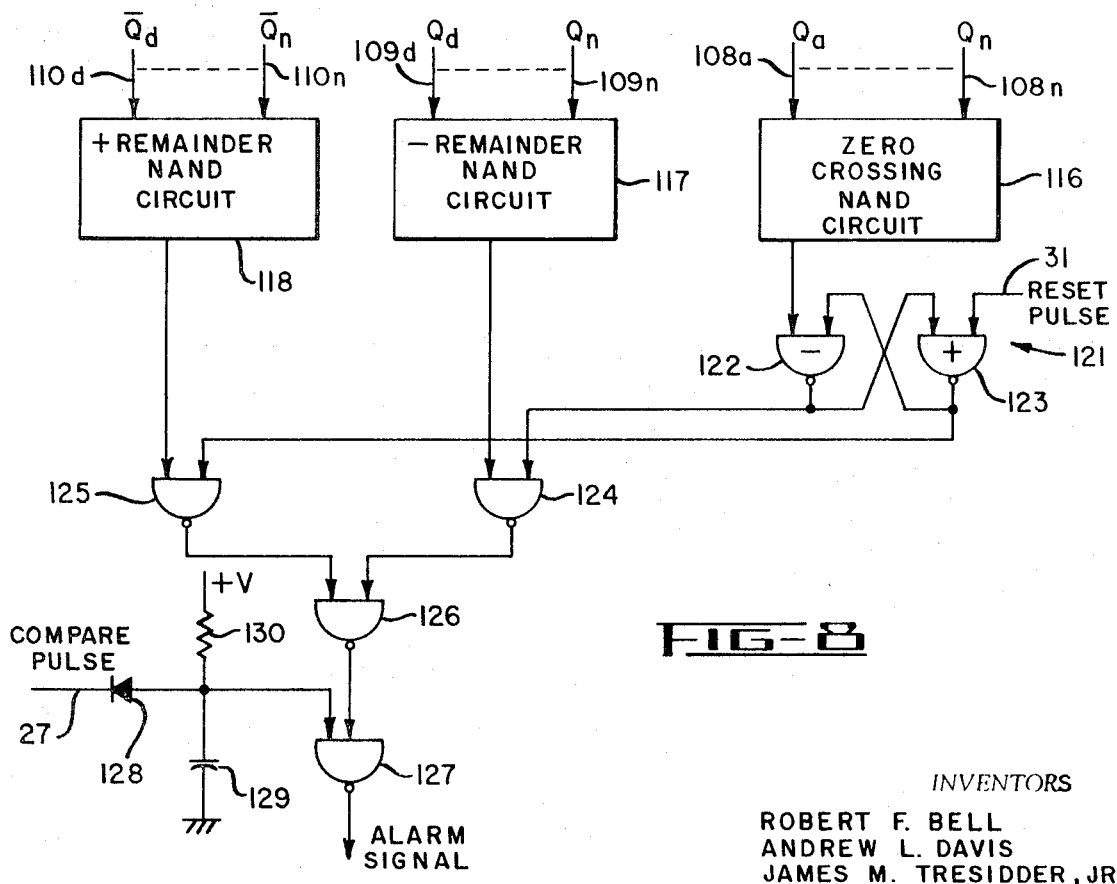
FIG. 8 is a schematic block and circuit diagram of the decoder circuit of FIG. 1.

Decoder circuit 11 is illustrated in FIG. 8 and comprises zero crossing NAND-circuit 116, negative (−) remainder NAND-circuit 117, and positive (+) remainder NAND-circuit 118. Circuit 116 is responsive to the Q output of each stage of the up/down counter. The remainder circuits 117 and 118 are responsive to the Q and $\bar{Q}$ outputs, respectively, of only certain stages 91 of the up/down counter. As illustrated in FIG. 8, only the associated outputs of the fourth stage 91d through the $n^{th}$ stage 91n are connected to circuits 117 and 118. The output of circuit 116 controls the operation of latching circuit 121 which comprises NAND-gates 122 and 123. The outputs of the remainder circuits 117 and 118 are applied to inputs of NAND-gates 124 and 125, respectively. The outputs of gates 122 and 123 are also applied to inputs of gates 124 and 125, respectively. The outputs of gates 124 and 125 control the operation of NAND-gate 126 which has an output connected to one input of NAND-gate 127. The second input to gate 127 is coupled through diode 128 to the comparison circuit. The diode is also connected through capacitor 129 to the ground reference potential and through resistor 130 to a positive supply voltage +V.

Briefly, the decoder circuit is responsive to a control pulse on line 27 that is produced by the comparison circuit on the negative going transition of the delayed down count control signal for reading the remainder count in the up/down counter. If the remainder count is outside of prescribed limits, an alarm indicating intrusion of the protected area is initiated. Since the remainder count may be positive or negative, depending on whether the duration of the delayed up or down count control signal is the longer, it is necessary to read both the magnitude and the sign (i.e., positive or negative) of the remainder count.

It is also necessary to have a range or limit on the remainder count over which an alarm indicating intrusion of the protected area is not initiated since it is difficult to maintain control over certain conditions that effect the capacitance between an aircraft and the ground and thus the contents of the up/down counter. For example, a wind may cause a random vibration of the wings of the plane and in this manner produce a modulation of the aircraft capacitance. Also, rain or snow on the ground or the aircraft may cause periodic changes in the aircraft capacitance. These capacitance changes cause the durations of the charge-discharge cycles of the aircraft capacitance, and thus the number of clock pulses produced during a number of cycles and the number of counts in the up/down counter to vary. The magnitude of the minimum count defining this range is a function of the number of clock pulses produced in the time period $\Delta T$ defined by the maximum change in the aircraft capacitance over a complete up/down counting cycle. In practice, this minimum count is determined empirically. This is implemented in the preferred embodiment of this invention illustrated in FIG. 8 by connecting the Q and $\overline{Q}$ outputs of only certain stages of the up/down counter to the remainder circuits. Specifically, only the associated outputs of the fourth stage 91d through the $n^{th}$ stage 91n are connected to the remainder circuits. Thus, the outputs of the first three stages 91a, 91b and 91c, which correspond to the three least significant bits of the contents of counter 10 are not connected to the remainder circuits. The contents of the up/down counter must therefore correspond to a count of greater than +8 or less than −8 for the remainder circuits to be responsive thereto.

When the system is initially turned on or reset the low logic level of the reset pulse on line 31 causes the output of gate 123 to be high to enable gate 122. Since all of the Q outputs of counter 10 are also low at this time, the output of circuit 116 is high and causes gate 122 to change operating states. The low output of gate 122 holds the latching circuit 121 in this state when the signal on line 31 goes high. The low output of gate 122 also disables gate 124 so that it is unresponsive to the output of circuit 117. The high output of gate 123 enables gate 125 so that it is responsive to the operation of circuit 118. As long as the count in counter 10 is equal to or greater than zero and is less than its maximum count, at least one of the inputs to circuit 116 is low so that the output thereof is high. This causes latching circuit 121 to continue to operate as described above with the outputs of gates 122 and 123 low and high, respectively.

If the contents of counter 10 corresponds to a count of less than 8, all of the $\overline{Q}$ inputs to circuit 118 are high so that the second input to gate 125 is low. The high output of gate 125 causes the output of gate 126 to be low to disable gate 127 to prevent generation of an alarm signal.

If the contents of counter 10 corresponds to a count of greater than 8, at least one of the inputs to the positive remainder circuit 118 is low. This causes gate 125 to switch operating states to provide a low output which causes the output of gate 126 to be high to enable gate 127.

When a positive comparison control pulse is received on line 27, diode 128 is cut off to allow the capacitor 129 to charge through resistor 130. If the output of gate 126 is still high when the charge on the capacitor exceeds the input threshold level of gate 127 the latter changes operating stages to produce a low logic level output that initiates an alarm indicating intrusion of the protected aircraft area.

When the contents of the up/down counter changes from a count of 0 to a count of −1, the $\overline{Q}$ output of each stage 91 changes from low to high. Since the inputs of circuit 116 are now all high, the output thereof is low and causes an inversion of the operating states in the latching circuit. Thus, the outputs of gates 122 and 123 which are now high and low enable gate 124 and disable gate 125, respectively. Although some inputs to circuit 116 will be low when the contents of counter 10 advances to correspond to a count of less than −1, the latching circuit will be held in the above state by the low output of gate 123. The negative remainder circuit 117 operates in a manner similar to that described above in relation to circuit 118 for initiating an indication of an intrusion of the protected aircraft when the contents of the counter 10 corresponds to a count of less than minus 8.

Figure 9:
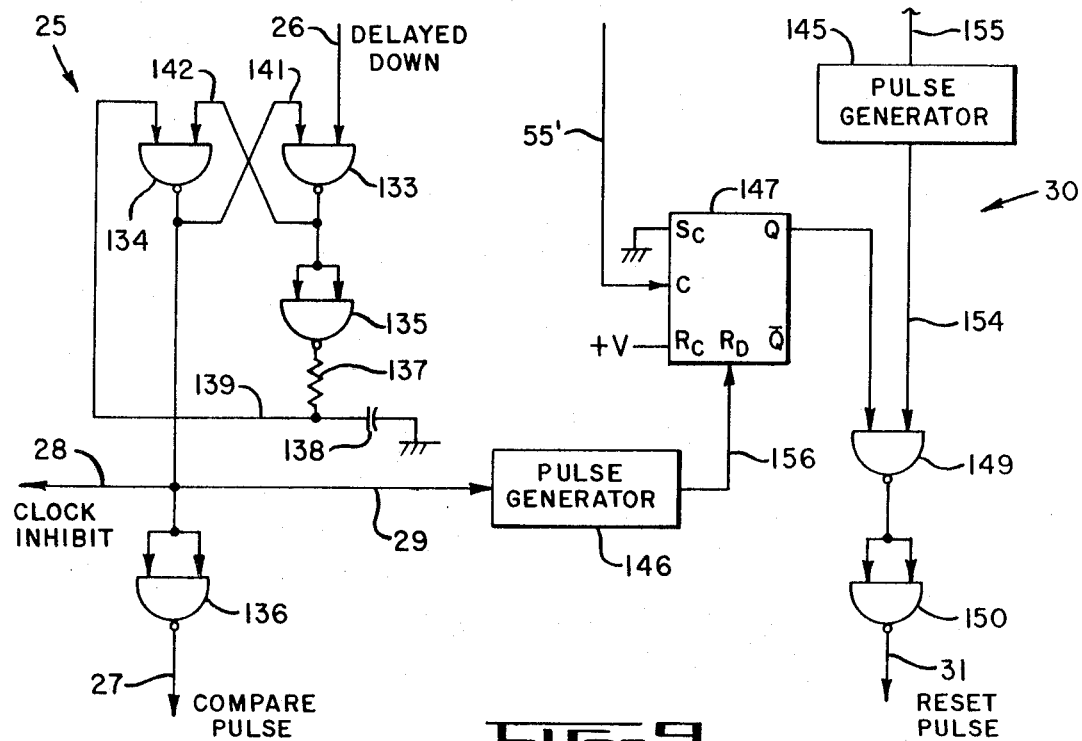
FIG. 9 is a schematic block and circuit diagram of the comparison and reset circuits of FIG. 1.

Referring now to FIG. 9, comparison circuit 25 comprises NAND-gates 133 to 136. Gates 133 and 134 comprise a latching circuit. The delayed down count control signal on line 26 is applied to the second input of gate 133. The output of gate 133 is inverted by gate 135 and coupled through resistor 137 and capacitor 138 to the ground reference potential. The junction of the resistor and capacitor is connected through line 139 to the second input of gate 134. Gates 133, 134 and 135 and the capacitor and resistor comprise a one-shot multivibrator. The output of gate 134 is inverted by gate 136 to provide a comparison pulse on line 27.

In operation, when the delayed down count control signal on line 26 is low the output of inverter 135 is also low and the capacitor 138 discharges through the inverter. Since the signal on line 139 is low, the output of gate 134 on line 141 is high.

When the delayed down count control signal on line 26 goes high, the output of inverter 135 also goes high and charging of capacitor 138 through resistor 137 is initiated. Since the logic level on line 142 is now low, however, the output of gate 134 remains high. When down counting is terminated on the negative transition of the delayed down count control signal the logic level on line 26 goes low causing the output of gate 135 to also go low to initiate discharge of the capacitor. The logic level on line 139 will remain high, however, until the charge on the capacitor is less than the input threshold level of gate 134. Since both of the inputs to gate 134 are now high, the output thereof goes low in order to produce the comparison control pulse. A short time later, the charge on the capacitor is less than the input threshold level of gate 134 and the output thereof goes high. The output of gate 134 is inverted by gate 136 to produce the positive comparison pulse on line 27. The output of gate 134 is applied on line 28 to the clock circuit to inhibit generation of clock pulses during generation of the comparison pulse.

Resent circuit 30 is also illustrated in FIG. 9 and comprises pulse generators 145 and 146, set-reset flip-flop 147, inverter 150, and NAND-gate 149. Pulse generator 145 may, by way of example, be a one-shot multivibrator producing an output that is applied on line 154 to gate 149. The Q output of flip-flop 147 is connected to the second input of gate 149. The clocked set and reset input terminals $S_c$ and $R_c$ of flip-flop 147 are grounded and connected to a positive voltage +V so that the input signals thereto are low and high, respectively. Thus, during normal operation the Q output of the flip-flop is high and enables gate 149. Pulse generator 146 is a circuit which produces a negative-going control pulse on line 156 on the trailing edge of the comparison pulse. The control pulse on line 156 is applied to the direct reset terminal $R_D$ of flip-flop 147.

When the system is initially turned on by actuating switch 155, the output of generator 145 is low for a prescribed time interval set by the generator. After this time interval multivibrator 145 reverts to its stable operating state and the output on line 154 goes high. Gates 149 and 150 are responsive to this operation for producing a negative pulse on line 31 which initially sets the components of the system.

When a pulse is absent from the input of generator 146, the output thereof is high. When a pulse on line 29 is received, however, the negative pulse on line 156 at the termination of the comparison pulse resets flip-flop 147 so that the output thereof is low. The next time that the charge on the aircraft capacitance exceeds the threshold level set by circuit 46 the negative transition of the timing signal on line 55' (e.g., see FIGS. 2a and 2b, time $t_{10}$) causes the Q output of the flip-flop to again go high. The Q output of flip-flop 147 is therefore low only for a period of time beginning at the termination of the comparison pulse and ending at the next threshold crossing of the charge on the aircraft capacitance. Gates 149 and 150 are responsive to this operation for producing a negative-going pulse on line 31 which resets the system.

A detailed description of the operation of the system of FIG. 1 will now be given in relation to the waveforms of FIG. 2. The system is initially turned on by actuating switch 155 to cause the reset circuit to generate a low logic level pulse 160 at time $t_0$, see FIG. 2l, which sets the contents of counters 8 and 10 to zero and sets the various logic circuits to their initial operating states. Thus, the up count control signals on lines 21 and 23 (FIGS. 2e and 2i) and the down count control signals on lines 22 and 24 (FIGS. 2f and 2j) are high and low, respectively, at time $t_0$.

During normal operation when the protected aircraft area is not compromised, the aircraft capacitance is charged by the current source 45 of circuit 7 at a rate which is a function of the aircraft capacitance, see FIG. 2a. Each time the charge on the capacitance exceeds the threshold level $V_{th}$, an output pulse is produced by the threshold circuit 46 of circuit 7 on line 55, see FIG. 2b, e.g., time $t_2$. The durations of the charge portions of each cycle in FIG. 2a are substantially equal since they are each a function of the aircraft capacitance which is substantially constant. The duration of the discharge portion of each cycle is constant and extends the time between threshold crossings.

Counter 8 is responsive to each output pulse on line 55 for counting the number of threshold crossings of the charge on the aircraft capacitance. The discharge portion of the charge-discharge cycle of the aircraft capacitance effectively increases the number of threshold crossings that are counted by counter 8 without increasing its capacity. Since the up count control signal is high, counter 10 counts "up" the number of clock pulses that are produced. When counter 8 is half-full, i.e., when the contents thereof corresponds to a count of $2^{m-1}$, the logic levels of the up and down count control signals are inverted, see FIGS. 2e and 2f time $t_5$. These signals cause counter 10 to now count "down" the number of clock pulses that are produced.

After $2^m$ threshold crossings have occurred, counter 8 automatically resets itself and the logic level of the down count control signal on line 22 is low, see FIG. 2f, time $t_{10}$. Since the negative transition of this signal does not occur during the duration of a delayed clock pulse in FIG. 2h, the outputs of the binary counter and the delay circuit are identical, see FIGS. 2f and 2j, respectively. The comparison circuit is responsive to the negative transition of the delayed down count control signal on line 26 at time $t_{10}$ for producing a comparison pulse 161 on line 27, see FIG. 2k. This comparison pulse causes circuit 11 to decode the contents of the up/down counter. The output of the comparison circuit on line 28 inhibits the clock from producing clock pulses 163 and 164 decoding the contents of counter 10.

Since an intrusion of the protected aircraft area did not occur during this operation cycle, the aircraft capacitance is substantially constant between time $t_0$ and time $t_{10}$. The time intervals $T_1$ and $T_2$, each of which is defined by $2^{(m \cdot 7E \cdot 1)}$ threshold crossings of the charge on the aircraft capacitance, are therefore substantially equal. Since the number of clock pulses produced during each of the time intervals $T_1$ and $T_2$ are therefore equal, the contents of counter 10 corresponds to a count of zero. The output of the decoder circuit in response to the comparison pulse is therefore high so that an alarm indicating intrusion of the protected aircraft area is not initiated. On termination of compare pulse 161, the reset circuit produces a reset pulse 162, see FIG. 2l which resets the system. On the next threshold crossing of the charge on the aircraft capacitance at time $t_{11}$, the reset circuit terminates the reset pulse 162.

Consider now that an intrusion of the protected area is made after at least $2^{(m \cdot 7E \cdot 1)}$ threshold crossings of the charge on the aircraft capacitance have occurred, for example, between times $t_5$ and $t_6$. Since the delayed down count control signal is now high, see FIG. 2j, counter 10 is counting down from the contents thereof the number of clock pulses that are produced. The presence of the intruder near the aircraft causes an increase in the aircraft capacitance and a corresponding increase in the duration of the charge period of each charge-discharge cycle of the aircraft capacitance as illustrated in FIG. 2c. This increase in the duration of each charge-discharge cycle causes the time interval $T_2'$ (during which threshold crossings of the charge on the aircraft capacitance occur when the down count control signal is high) to be greater than the time interval $T_1$ (during which threshold crossings of the charge on the aircraft capacitance occur when the up count control signal is high).

After $2^m$ threshold crossings have occurred at time $t_{12}$, counter 8 automatically resets and the down count control signal on line 22 goes low, see FIG. 2f. Since this negative transition occurs during generation of delayed clock pulse 89, the negative transition of the corresponding delayed down count control signal is extended until time $t_{13}$, see FIG. 2j. This allows sufficient time for the effect of the corresponding clock pulse 89' to be translated through counter 10 so that the contents thereof will not be decoded while the stages of the counter are changing operating states. Comparison circuit 25 is responsive to the negative transition of the delayed down count control signal on line 26 at time $t_{13}$ for producing the comparison pulse 165, see FIG. 2k, which causes circuit 11 to decode the contents of the up/down counter. The inhibit pulse on line 28 prevents the clock from producing clock pulses 166 and 167 during decoding of counter 10. Since the duration $T_2'$ of the contents of the down count cycle is greater than the duration $T_1$ of the up count cycle the remainder count in the up/down counter is negative and has an absolute value greater than zero. If the magnitude of the remainder count is greater than 8 in the system illustrated herein the outputs of the decoder circuit in response to comparison pulse 165 is low so that an alarm indicating intrusion of the protected aircraft area is initiated. On termination of comparison pulse 165, circuit 30 produces reset pulse 168, see FIG. 2e which resets the system. On the next threshold crossing of the charge on the aircraft capacitance at time $t_{15}$, reset pulse 168 is terminated.

What is claimed is:

1. Apparatus for detecting intrusion of a protected area including an object to be protected, said protected object having a capacitance associated with the protected area, comprising
   first means for defining two distinct time intervals and producing indications of the durations thereof, each of said time intervals being related to a characteristic associated with the security of the protected area, said first-named indicating means comprising
   means for charging the object,
   means for discharging said object when the charge thereon exceeds a prescribed threshold level, and
   a first counter circuit producing a first output signal having one logic level for a predetermined number of threshold crossings of the voltage across said object and defining one of said time intervals, said first counter circuit producing a second output signal having one logic level for the same number of threshold crossings of the charge on said object and defining the other time interval, at least one threshold crossing produced during said first and second time intervals being distinct, and
   first means for comparing said duration indications and producing an output as a measure of intrusion of the protected area.

2. Apparatus according to claim 1 wherein said first comparing means comprises:
   a clock generator producing a train of clock pulses, and
   second means for comparing the number of clock pulses produced during one of said time intervals with the number of clock pulses produced during the other time interval for detecting intrusion of the protected area.

3. Apparatus according to claim 2 wherein said second comparing means comprises a second counter circuit responsive to the first output signal of said first counter circuit for first counting the number of clock pulses generated during said one time interval and responsive to the second output signal of said first counter circuit for second counting the number of clock pulses generated during said other time interval, said second counter circuit comparing indications of said first and second countings for producing an output which is a relative indication of the durations of said time intervals.

4. Apparatus according to claim 3 wherein the output of said second counter circuit is the difference between the first and second countings and thus the difference between the number of clock pulses produced during said time intervals.

5. Apparatus according to claim 2 wherein said second comparing means comprises an up/down counter responsive to said first output signal of said first counter circuit for counting up the number of clock pulses produced during said one time interval, and responsive to the second output signal of said first counter circuit for counting down from the contents of said up/down counter the number of clock pulses produced during said other time interval, the remainder count in said up/down counter at the termination of the other time interval being an indication of the difference between the number of clock pulses produced during, and of the durations of, said time intervals.

6. Apparatus according to claim 3 wherein said clock generator produces a train of delayed clock pulses and said first-named indicating means includes a first delay circuit for extending the durations of the output signals of said first counter circuit when a threshold crossing of the charge on the object occurs during generation of a delayed clock pulse.

7. Apparatus according to claim 3 wherein said charging means comprises a constant current source connected in parallel with said object; and, said discharging means comprises a first threshold circuit connected in parallel with the object.

8. Apparatus according to claim 3 wherein said first-named indicating means includes means for extending the duration of the time interval between the threshold crossing of the charge on the object and the subsequent initiation of charging of the object.

9. Apparatus according to claim 7 wherein said first-named indicating means includes second means for indicating when the charge on the object is less than the prescribed threshold level for greater than a predetermined time interval.

10. Apparatus according to claim 7 wherein said first counter circuit is an $m$-stage counter in which the first and second output signals are coupled from the Q and $\bar{Q}$ terminals of the $m^{th}$ stage thereof, said first and second output signals having first and second logic levels, respectively, during counting of $2^{m-1}$ threshold crossings of the charge on the object and having second and first logic levels, respectively, during subsequent counting of an additional $2^{m-1}$ threshold crossings of the charge on the object.

11. Apparatus according to claim 5 wherein said first comparison means includes
 a control circuit responsive to termination of the second output signal of said first counter circuit at the end of the other time interval for producing a control signal,
 a second threshold circuit responsive to the remainder count in said up/down counter for producing an output signal when this remainder count is outside of prescribed limits, and
 third means for indicating intrusion of the protected area when an output signal of said second threshold circuit is produced during generation of a number of said control signals form said control circuit.

12. Apparatus for detecting intrusion of a protected vehicle having a capacitance associated with the security of the vehicle comprising
 means for charging the vehicle to a prescribed threshold level at a rate that is a function of said capacitance and for discharging the vehicle,
 means responsive to the operation of said first-named means for producing first and second output signals indicating the durations of first and second distinct time intervals which may have different durations, respectively, that are each defined by the same number of threshold crossings of the charge on the vehicle, and
 first means comparing said first and second output signals of said indicating means for producing a relative indication of the durations of the time intervals and the security of the protected area.

13. Apparatus for detecting intrusion of a protected vehicle having a capacitance associated with the security of the vehicle comprising
 means for charging the vehicle to a prescribed threshold level at a rate that is a function of said capacitance and for discharging the vehicle,
 means responsive to the operation of said first-named means for producing first and second output signals indicating the durations of first and second distinct time intervals, respectively, that are each defined by the same number of threshold crossings of the charge on the vehicle, and
 first means comparing said first and second output signals of said indicating means for producing a relative indication of the durations of the time intervals and the security of the protected area, said first comparing means comprising
 a clock generator producing clock pulses, and
 second means responsive to clock pulses and the first and second output signals of said indicating means for comparing the number of clock pulses produced during the first time interval with the number of clock pulses produced during the second time interval.

14. Apparatus according to claim 13 wherein said second comparing means takes the difference between the numbers of clock pulses produced during the time intervals.

15. Apparatus according to claim 14 wherein said indicating means and said second comparing means each comprise a digital counter circuit.

16. Apparatus for detecting intrusion of a protected vehicle having a capacitance with respect to the ground comprising
 means for producing first and second outputs indicating the durations of first and second time intervals, respectively, which are distinct and each a function of the vehicle capacitance, said first named indicating means comprising
 means connected in parallel with the vehicle for charging the vehicle at a rate which is a function thereof,
 a first threshold circuit having an output,
 means for connecting said first threshold circuit in parallel with the vehicle, said first threshold circuit operating in one state to discharge the vehicle when the magnitude of the charge thereon exceeds a prescribed threshold level, and
 a first digital counter circuit responsive to operation of said first threshold circuit for counting the number of threshold crossings of the charge on the vehicle, said first counting circuit having a first output having a particular value for a prescribed number of threshold crossings of the charge on the vehicle for defining the first time interval and having a second output having a particular value for the same number of threshold crossings for defining the second time interval, at least one threshold crossing in each of said time intervals being distinct, and
 means for comparing the outputs of said indicating means for indicating intrusion of the protected vehicle.

17. Apparatus according to claim 16 wherein said comparing means comprises
 a clock generator producing clock pulses, and
 a second digital counting circuit responsive to said clock pulses and said first and second outputs of said first counting circuit for counting the number of clock pulses generated during said first and second time intervals and producing a relative indication of the number of clock pulses generated during said time intervals.

18. Apparatus according to claim 17 wherein said first connecting means comprises a first delay circuit connected between said first threshold circuit and the vehicle and extending the duration of operation of the first threshold circuit in one state.

19. Apparatus according to claim 17 wherein said first-named indicating means includes a detector circuit detecting the output of said first threshold circuit for initiating an alarm when the first threshold circuit output is constant for greater than a predetermined minimum time interval.

20. The method of detecting intrusion of an object to be protected which has an associated capacitance consisting of the steps of comparing the durations of two distinct time intervals which are each a function of the object capacitance and may have different durations, and producing an alarm when one of the time intervals changes relative to the other.

21. The method of detecting intrusion of an object having an associated capacitance consisting of the steps of
 defining two distinct time intervals each having a duration which is variable and is a function of the object capacitance, producing a relative indication of the durations of the two distinct time intervals, and indicating intrusion of the protected object if the magnitude of the relative indication is greater than a prescribed value.

22. The method of detecting intrusion of an object having an associated capacitance consisting of the steps of defining two distinct time intervals each having a duration which is a function of the object capacitance, said defining step including the additional steps of charging the object at a rate which is a function of the object capacitance, discharging the object when the charge thereon exceeds a prescribed threshold level, and counting the same number of threshold crossings of the charge on the object in defining each time interval, producing a relative indication of the durations of the two distinct time intervals, said step of producing a relative indication including the additional steps of producing clock pulses, counting first the number of clock pulses produced during one of said time intervals, counting second the number of clock pulses produced during the other time interval, and comparing the first and second countings of clock pulses, and indicating intrusion of the protected object if the magnitude of the relative indication is greater than a prescribed value.

23. The method according to claim 22 wherein said step of comparing the clock pulse counts includes the step of taking the difference between the first and second countings of clock pulses.

24. The method of detecting intrusion of a protected area which contains an object forming at least part of a capacitor having a characteristic capacitance consisting of the steps of charging the object, comparing the times required for the charge on the object to change a predetermined amount a prescribed number of times during different time intervals, said comparing step including the steps of obtaining a first indication of the time required for the charge on the object to change the predetermined amount the prescribed number of times, obtaining a second indication of the time required for the charge on the object to change the predetermined amount the prescribed number of times subsequent to obtaining the first indication, and obtaining a third indication of the difference between said first and second indications, and producing an alarm-indicating intrusion of the protected area when the magnitude of the comparison signal exceeds a predetermined limit.

25. The method according to claim 24 including the step of periodically charging the object to a prescribed threshold level and discharging the object.

26. The method according to claim 25 wherein the steps of obtaining the first and second indications comprise counting the same number of charge-discharge cycles of the object for defining the two distinct time intervals.

27. The method according to claim 26 including the step of producing a train of clock pulses and wherein the step of obtaining said third indication comprises the steps of counting the number of clock pulses produced during one time interval, counting the number of clock pulses producing during the subsequent time interval, and taking the difference between the number of clock pulses produced during the two time intervals.

28. Apparatus for detecting the compromise of a protected zone, said protected zone having a variable characteristic which undergoes a change in value when said compromise exists, said apparatus comprising means for defining two separate time intervals having durations directly dependent on the value of said characteristic, and means for comparing the duration of one of said intervals with the duration of the other of said intervals and producing an output as an indication of said compromise when either duration changes relative to the other.

29. Apparatus according to claim 28 wherein said comparing means comprises means for measuring the difference between said durations of the time intervals.

30. Apparatus according to claim 29 in which said protected zone comprises a vehicle and said variable characteristic is the capacitance associated with said vehicle.

* * * * *

UNITED STATES PATENT OFFICE
CERTIFICATE OF CORRECTION

Patent No. 3,623,159            Dated November 23, 1971

Inventor(s) Robert F. Bell; Andrew L. Davis; James M. Tresidder, Jr.

It is certified that error appears in the above-identified patent and that said Letters Patent are hereby corrected as shown below:

ABSTRACT - first line after "time" delete "the capacitance of."
Column 1, line 54, after "capacitance" insert --means--.
Column 1, line 55, after "capacitance" insert --means--.
Column 2, line 44, after "aircraft" delete "capacitance."
Column 2, line 47, after "aircraft" delete "capacitance."
Column 2, line 65, after "aircraft" delete "capacitance."
Column 2, line 66, after "of" delete "this" and insert --its--.
Column 2, line 67, first word, delete "capacitance" and insert therefor --object--.
Column 2, line 68, after "the", first occurrence, delete "capacitance" and insert therefor --it--.
Column 3, line 27-28, delete "between the body of the aircraft and" and substitute therefor --connected to--.
Column 3, line 28, after "aircraft" delete "capacitance" and insert --, or its electrical equivalent as shown,--.
Column 3, line 40, after "aircraft" delete "capacitance."
Column 3, line 59, after "aircraft" delete "capacitance."
Column 4, lines 4 and 12, after "aircraft" delete "capacitance."
Column 4, line 19, delete "capacitance."
Column 4, line 25, after "from" change "1 ohms" to "1k ohms."
Column 4, line 28, delete "$V_o(t)=1R(1-e^{'7E't/RC})$" and insert --$V_0(t) = IR(1-e^{-t/RC})$--.
Column 4, line 31, "2" should read -- in --;
Column 4, line 40, after "aircraft" delete "capacitance."
Column 4, lines 66 and 70, after "aircraft" delete "capacitance."
Column 5, line 10, delete "$2^{m'7E'1}$" and insert --$2^{m-1}$--.
Column 5, line 13, delete "$2^{m'7E'}$" and insert --$2^{m-1}$--.
Column 5, line 16, delete "$2^{m'7E'1}$" and insert --$2^{m-1}$--.
Column 5, line 21, delete "$2^{m'7E'1}$" and insert --$2^{m-1}$--.
Column 5, line 31, delete "$2^{m'7E'1}$" and insert --$2^{m-1}$--.

UNITED STATES PATENT OFFICE
CERTIFICATE OF CORRECTION

Patent No. 3,623,159          Dated November 23, 1971

Inventor(s) Robert F. Bell; Andrew L. Davis; James M. Tresidder, Jr.

PAGE 2

It is certified that error appears in the above-identified patent and that said Letters Patent are hereby corrected as shown below:

Column 5, line 34, delete "$2^{m'7E'1}$" and insert --$2^{m-1}$--.

Column 5, line 47, after "aircraft" delete "capacitance."
Column 7, line 21, after "aircraft" delete "capacitance."
Column 8, line 58, after "that" delete "effect" and insert therefor --affect--.
Column 8, line 59, delete "between" and insert --of--; same line, after "aircraft" delete "and the" and insert --relative to--.
Column 8, line 67, after "aircraft" delete "capacitance."
Column 10, line 20, delete "Resent" and insert --Reset--.
Column 10, line 48, delete "capacitance."
Column 10, line 54, after "aircraft" delete "capacitance."
Column 10, line 69, after "aircraft" delete "capacitance."
Column 10, line 72, after "the" delete "capacitance" and insert --aircraft--.
Column 11, lines 7 and 8, after "aircraft" delete "capacitance."
Column 11, line 36, delete "$2^{(m'7E'1)}$" and insert --$2^{(m-1)}$--.
Column 11, line 37, after "aircraft" delete "capacitance."
Column 11, line 51, delete "$2^{(m'7E'1)}$" and insert --$2^{(m-1)}$--.
Column 11, lines 52 and 59, after "aircraft" delete "capacitance."
Column 11, line 63, delete "capacitance."
Column 11, line 65, after "aircraft" delete "capacitance."
Column 12, line 7, after "decoding" insert --the contents--.
Column 12, line 8, delete "of the contents."
Column 12, line 18, after "aircraft" delete "capacitance."
Column 13, line 29, delete "$2^{m'7E'1}$" and insert --$2^{m-1}$--.

Signed and sealed this 23rd day of May 1972.

(SEAL)
Attest:

EDWARD M. FLETCHER, JR.      ROBERT GOTTSCHALK
Attesting Officer              Commissioner of Patents